Nov. 23, 1937. J. F. DAILEY 2,099,971
AUTOMATIC CONTROLLER FOR A RADIO RECEIVING SET
Filed May 8, 1929 7 Sheets-Sheet 1

Inventor
Jay F. Dailey
By
Martin T. Fisher
Attorn-

Nov. 23, 1937.    J. F. DAILEY    2,099,971
AUTOMATIC CONTROLLER FOR A RADIO RECEIVING SET
Filed May 8, 1929    7 Sheets-Sheet 3

Nov. 23, 1937.  J. F. DAILEY  2,099,971

AUTOMATIC CONTROLLER FOR A RADIO RECEIVING SET

Filed May 8, 1929   7 Sheets-Sheet 4

Inventor
Jay F. Dailey

By
Martin T. Fisher
Attorney

Nov. 23, 1937.  J. F. DAILEY  2,099,971
AUTOMATIC CONTROLLER FOR A RADIO RECEIVING SET
Filed May 8, 1929  7 Sheets-Sheet 5
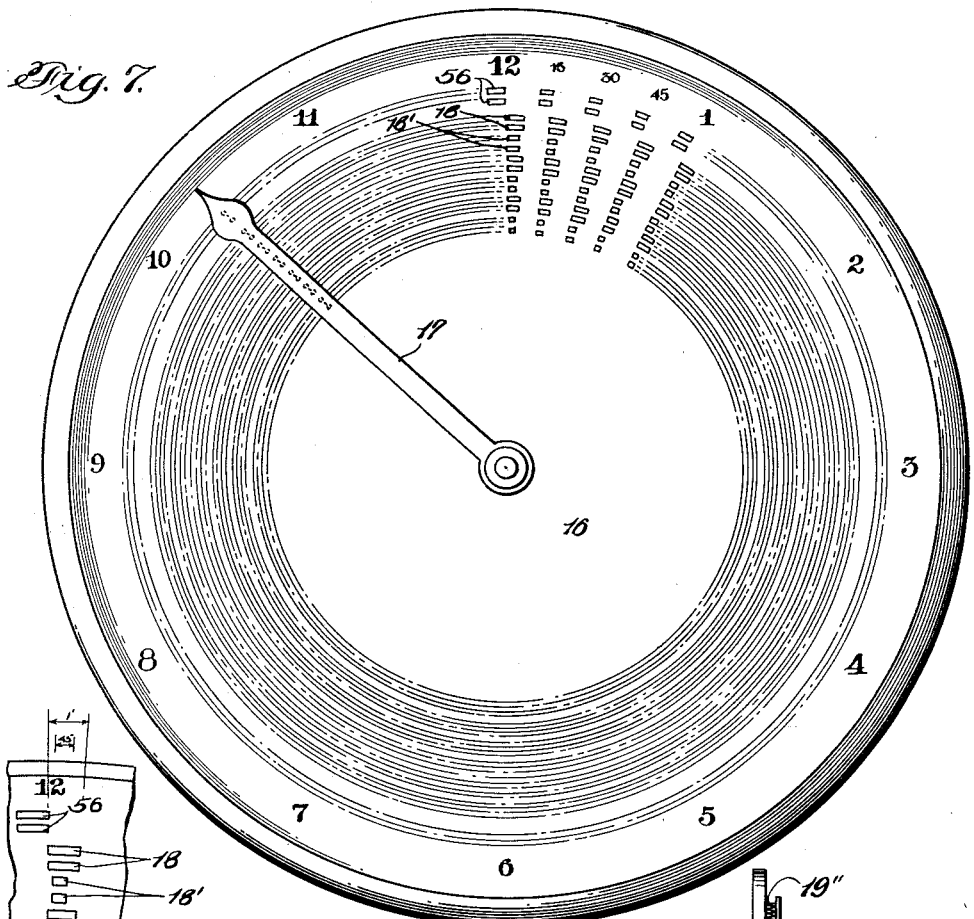
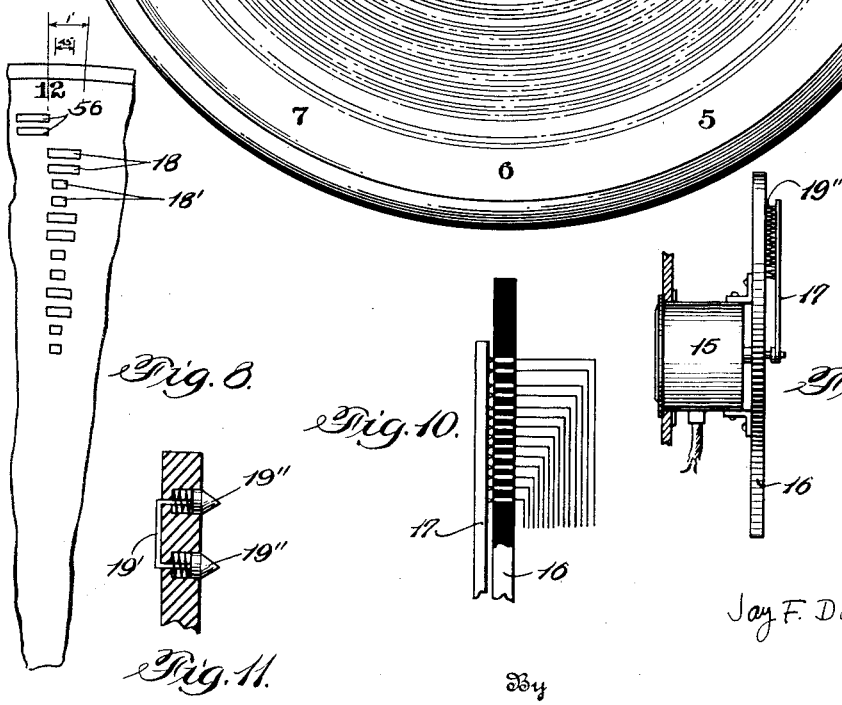
Inventor
Jay F. Dailey
By
Martin T. Fisher  Attorney

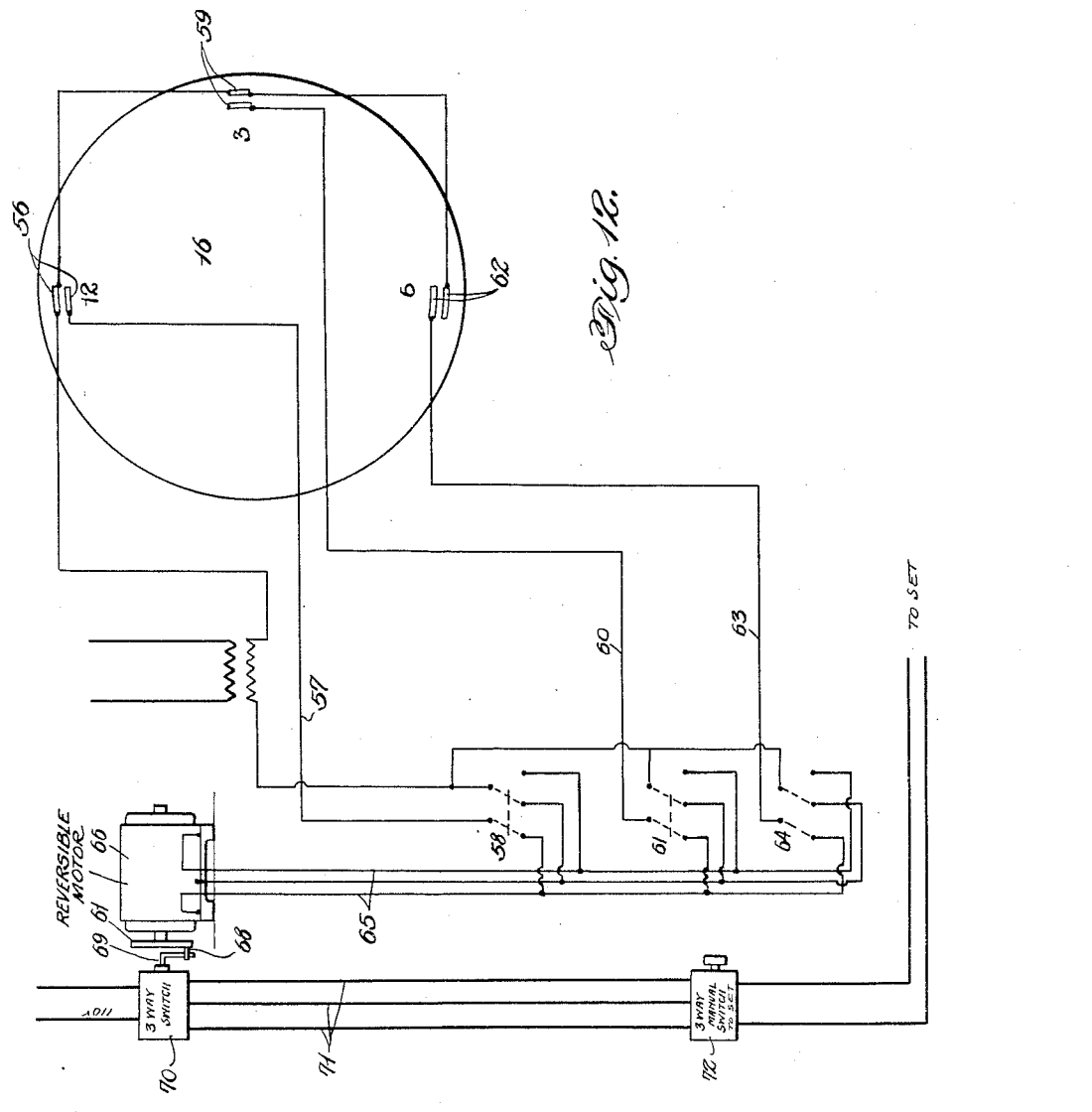

Nov. 23, 1937.   J. F. DAILEY   2,099,971
AUTOMATIC CONTROLLER FOR A RADIO RECEIVING SET
Filed May 8, 1929   7 Sheets-Sheet 7
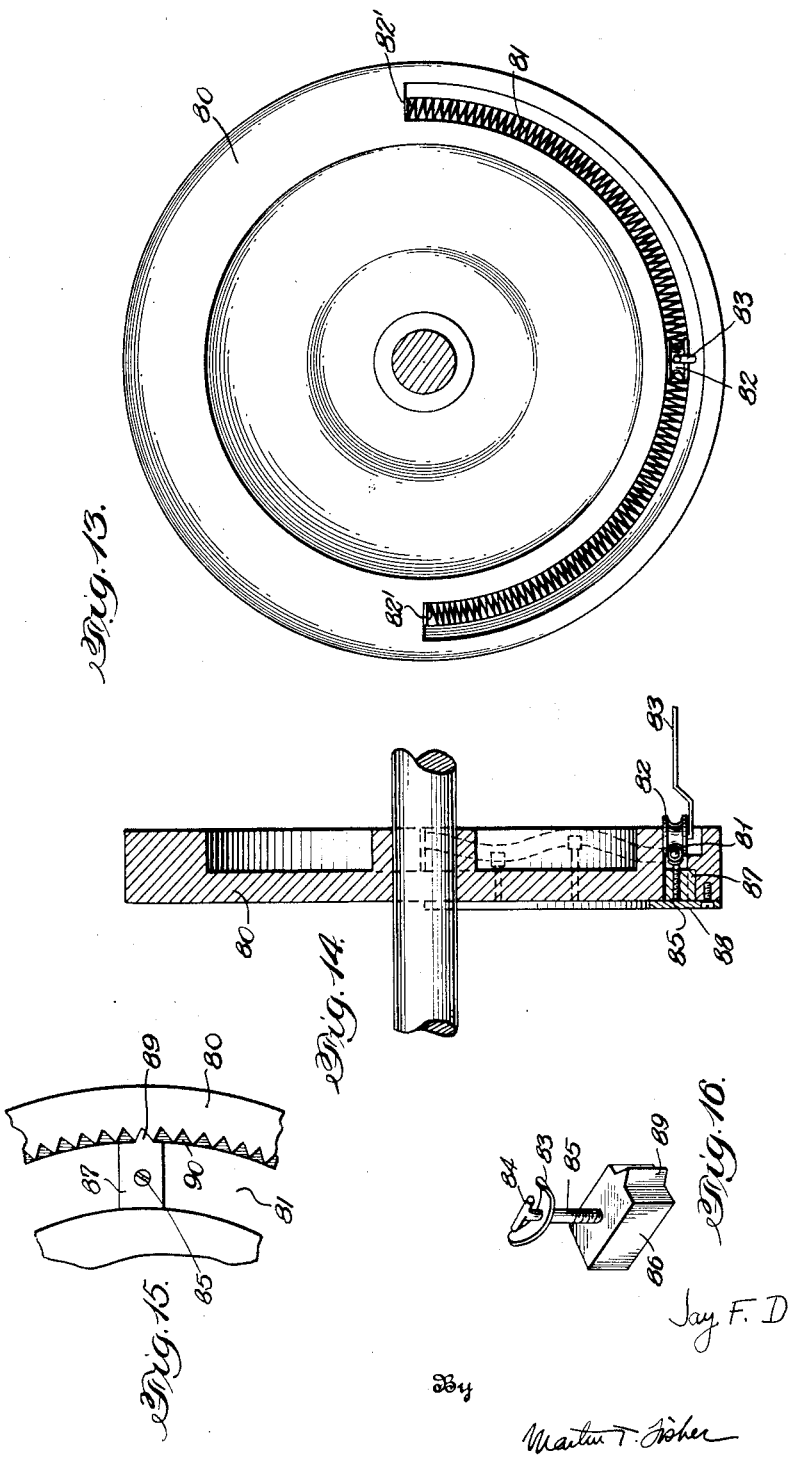
Inventor
Jay F. Dailey
By
Martin T. Fisher   Attorney Patented Nov. 23, 1937

2,099,971

UNITED STATES PATENT OFFICE 2,099,971

AUTOMATIC CONTROLLER FOR A RADIO RECEIVING SET

Jay F. Dailey, Hillside, N. J., assignor of one-fourth to Raymond Schroeder, Essex County, N. J., and one-half to Martin T. Fisher and Aksel M. Pedersen Application May 8, 1929, Serial No. 361,416

17 Claims. (Cl. 250—20)

This invention is an apparatus for controlling the tuning of a radio receiving set, which will tune in the set on selected predetermined stations at selected predetermined times, entirely automatically. The apparatus is set in advance to bring in a given station at a given time, to hold that station for any desired period of time, to bring in another station at a given time, to hold that station for any desired period, and so on all without the attention of an operator.

The apparatus may also be set in advance to put the radio receiving set into operation at any desired time, to bring in different stations at predetermined successive or intermittent periods, and then to turn off the set. The apparatus may be set in advance to have silent periods of any desired length at any desired time during the day or night.

Once the apparatus is set in advance, as above described, it functions entirely automatically, in starting, in stopping, in tuning in particular stations at particular times and in establishing silent periods. The operator can, at the beginning of the evening, determine at what time he wants the set to start, can determine just what stations he wants to listen to during the evening, at what times he wants the set to be silent, at what time he wants the set to be turned off, and can set the control mechanism to perform these predetermined things at predetermined times. After the operator has decided on his program and set the controls accordingly, he does not need to touch the mechanism again, while the apparatus will control the starting and stopping of the set, and will tune in the desired stations at the desired times, and so will automatically produce the desired program.

By this invention, for instance, an owner of a radio receiving set equipped with this automatic tuning device, can at a given hour, say six o'clock P. M. decide that he desires his evening program to be—station 1 at 6 o'clock—station 5 at 6:30—station 4 at 6:45—station 3 at 7:15—silent from 8 to 8:30—station 5 at 8:30—station 2 at 9:30; that the current be turned off at 11 P. M. and that the set become operative again at 6:30 A. M. the following morning at which time reception of a program from station 6 is desired.

At the first mentioned time—say 6 o'clock P. M., the owner is by a very simple operation enabled to so set the control board levers, conveniently located upon the front of the cabinet, so as to assure the reception of the selected program, without any further manual control.

The automatic control of this invention may be so set as to render it inoperative and the set operated manually in the ordinary way.

A program may be selected for those who do not understand the manipulations necessary to tune a receiving set and they are thereby enabled to receive a program where the operator is not available for the entire period, and where otherwise the set would be turned off, during the absence of the operator.

More specifically, the apparatus comprises a plurality of station selector elements which control the position of the condenser shaft of the radio set which controls the tuning. The station selectors are put into movement in unison with each other and with the tuning mechanism at a predetermined time, and this movement is stopped when the desired station is tuned in.

The starting and stopping of the station selectors and tuning mechanism is controlled by a continuously driven clock or timing mechanism and by a control board connected in series with the clock so that at predetermined times, controlled by the setting of the controls, circuits are established which result in turning the station selectors and tuning mechanism to tune in a desired station at a desired time.

The control board comprises a plurality of time levers, one lever for a given time period, such as 15 minutes, for example. That is to say, one lever is for 6 o'clock, the next for 6:15, the next for 6:30, and so on for twelve or twenty-four hours. Since any given period is controlled solely by the lever for that period, there being only one lever for one period, it is impossible to set the control board to cause any conflicting circuits to be established, however the control levers may be set.

The starting and stopping of the movement of the station selectors and tuning mechanism is controlled by means operated by the closing of two circuits by the clock and by a given time lever. If a time lever is set to tune in station A at 6 o'clock, the clock at 6 o'clock, bridges two contacts connected in series with two contacts on the control board, these last two contacts being bridged by the 6 o'clock time lever. This establishes a circuit through an electromagnetic latching device and puts the latch in a potential latching position. A fraction of a minute later, the clock bridges two other contacts which likewise are in series with two additional contacts on the control board, which additional contacts are also bridged by the 6 o'clock time lever, thus establishing a second circuit through a motor, which is started and moves the station selectors and condenser shaft in unison. This movement of the station selectors and condenser shaft continues until the energized latch snaps into a notch on its station selector, which notch is so placed that when the latch is engaged therewith, the station corresponding to that selector is tuned in. The station is thus tuned in. The motor circuit passes through circuit breakers controlled by the latches, so that when the latch snaps into engagement with its station selector, it immediately breaks the motor circuit and stops the motor.

The desired station is thus tuned in and this condition continues as long as the contacts are closed by the clock. At the expiration of the period, the switch arm carried by the clock or other timing mechanism, breaks its circuits and moves on to complete circuits through the contacts controlled by the next time lever. In case the next time lever is in inactive or neutral position, the set will be silent for this period. In case the next time lever is set for a given station, circuits as above described will be established and the proper station tuned in.

The radio waves received by a set vary considerably in strength, due to distance, and broadcasting strength. In order to maintain the volume of sound from the set substantially constant, even though the signals vary in strength, an automatic control is provided in conjunction with the tuning mechanism which varies the current operating the loud speaker in accord with the station then tuned in. This automatic control has a variable setting, so that it can be properly adjusted for the several stations. However, this adjustment may not be entirely adequate, because of varying atmospheric conditions, which may strengthen or weaken all the signals. In order to take care of this day-to-day variation, means is provided for variably positioning the resistor of the rheostat which controls the loud speaker, for changing its effect as a whole.

The condenser shaft of a radio set usually has an arc of movement less than 360°. Means is therefore provided for reversing the direction of movement of the condenser shaft by reversing the motor, when the shaft has reached its limit of movement in either direction.

The main features of the invention having been thus outlined, other features and details of the invention will be described in connection with the accompanying drawings, illustrating one embodiment of the invention. It should be understood that the invention is not limited to this particular embodiment, but may be carried out in other ways.

In these drawings:

Fig. 7 is a detail of the clock face;

Fig. 8 is a detail of a segment of the clock face;

Fig. 9 is a view showing the mounting of the clock;

Fig. 10 is a sectional view through a portion of the clock face;

Fig. 11 is a detail view of a contact on the hand of the clock;

Fig. 12 is a wiring diagram for the starting and stopping of the mechanism at the desired hours;

Fig. 13 is a view of a cam device used in controlling the volume of sound;

Fig. 14 is a section taken through Fig. 13;

Fig. 15 is a rear view of a portion of Fig. 13 showing a detail;

Fig. 16 is a perspective view of an element used in connection with variably positioning the cam; and Fig. 17 is a detail view of a rheostat.

Figure 1:
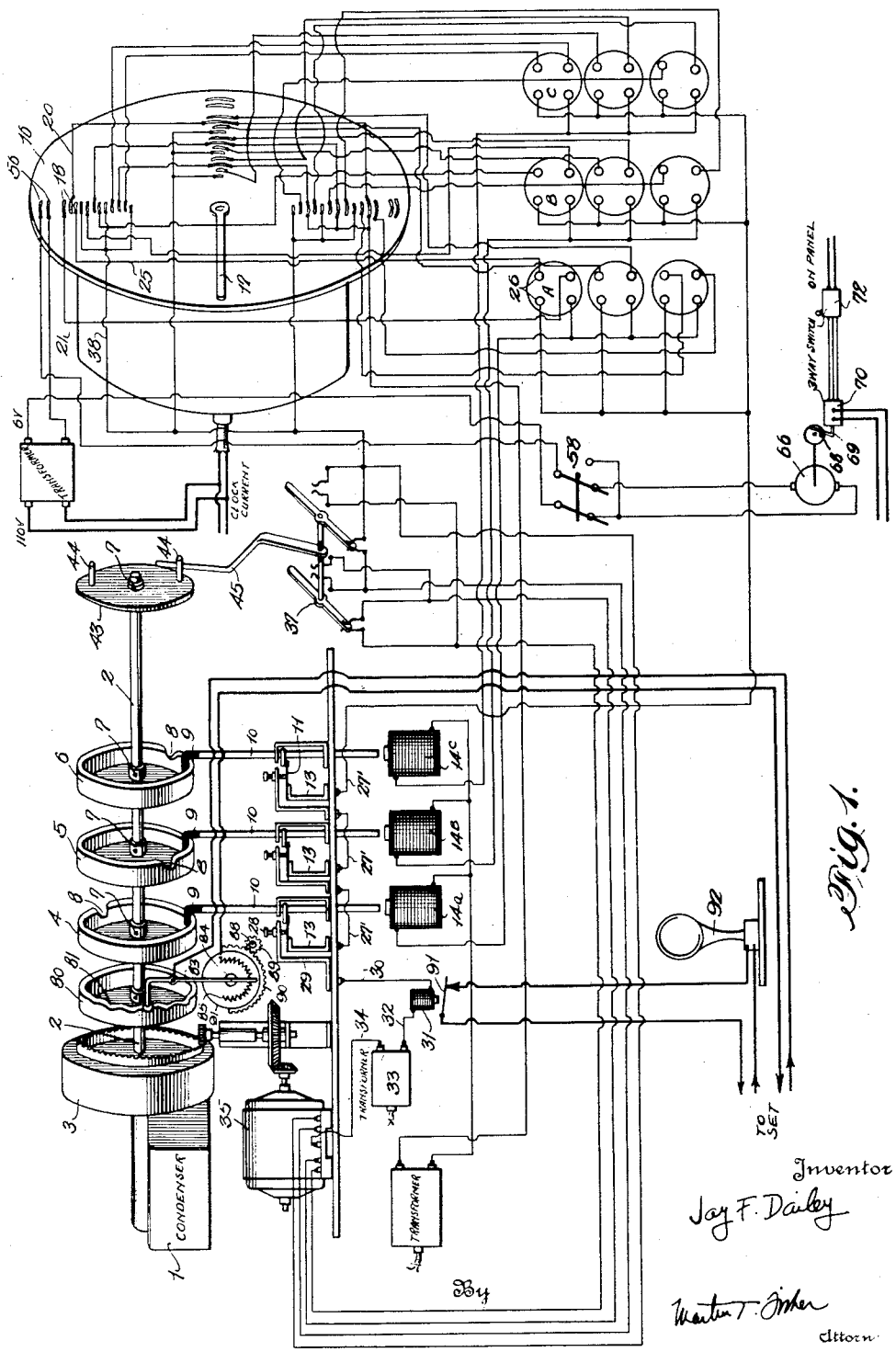
Fig. 1 is a diagrammatic perspective of the apparatus and wiring connections.

Referring now to these drawings in which similar reference characters indicate similar parts, the condenser of the radio set which controls the tuning is indicated at 1. The condenser shaft 2 is extended and on it is mounted the usual calibrated tuning dial 3, the position of which determines what station is tuned in. Evidently, the position of this shaft determines what station is being received by the set.

In order to position the condenser shaft 2 at any desired point, there is mounted on that shaft a plurality of station selectors 4, 5 and 6. Three of these station selectors are shown, but, of course, any suitable number could be provided. These station selectors are variably positionable on the shaft 2 by means of set screws 7, or the like, whereby the angular setting of a station selector can be effected.

Each station selector is provided with a notch 8, which is adapted, under certain conditions, to be engaged by the latching end 9 of a rod 10, which is normally pressed upwardly out of latching position by a spring 11 fastened to the rod at 12, the spring being carried by a standard 13.

Each of the rods 10 is controlled by its electromagnet 14A, 14B or 14C. When one of these electromagnets is energized, it exerts a pull on its corresponding rod 10 and latch 9, so that when the shaft 2 is rotated, the latch 9 will engage with its notch 8 and lock the station selector in a position at which its station is tuned in.

The mechanism for operating the condenser shaft 2 and electromagnets 14A, 14B or 14C at predetermined times to tune in predetermined stations, will now be described.

Timing mechanism, such as a continuously driven clock, preferably one of the type driven and regulated directly from the lighting circuit is provided, the casing of which is indicated at 15, the face at 16 and its contact making arm at 17. Contacts on the face of the clock are connected in series with a control board and at predetermined times, as controlled by the setting of the levers on the control board, two circuits are closed, one of which controls the mechanism for turning the condenser shaft, and the other of which controls the electromagnets 14A, 14B or 14C, for controlling the operation of the station selectors 4, 5 or 6. These contacts on the face of the clock are bridged or closed by the hand of the clock.

The term "clock", or the like, as used in the specification and claims is intended to cover any timing mechanism which actuates a circuit controlling arm 17, or its equivalent, to control one or more circuits at predetermined times.

Figure 2:
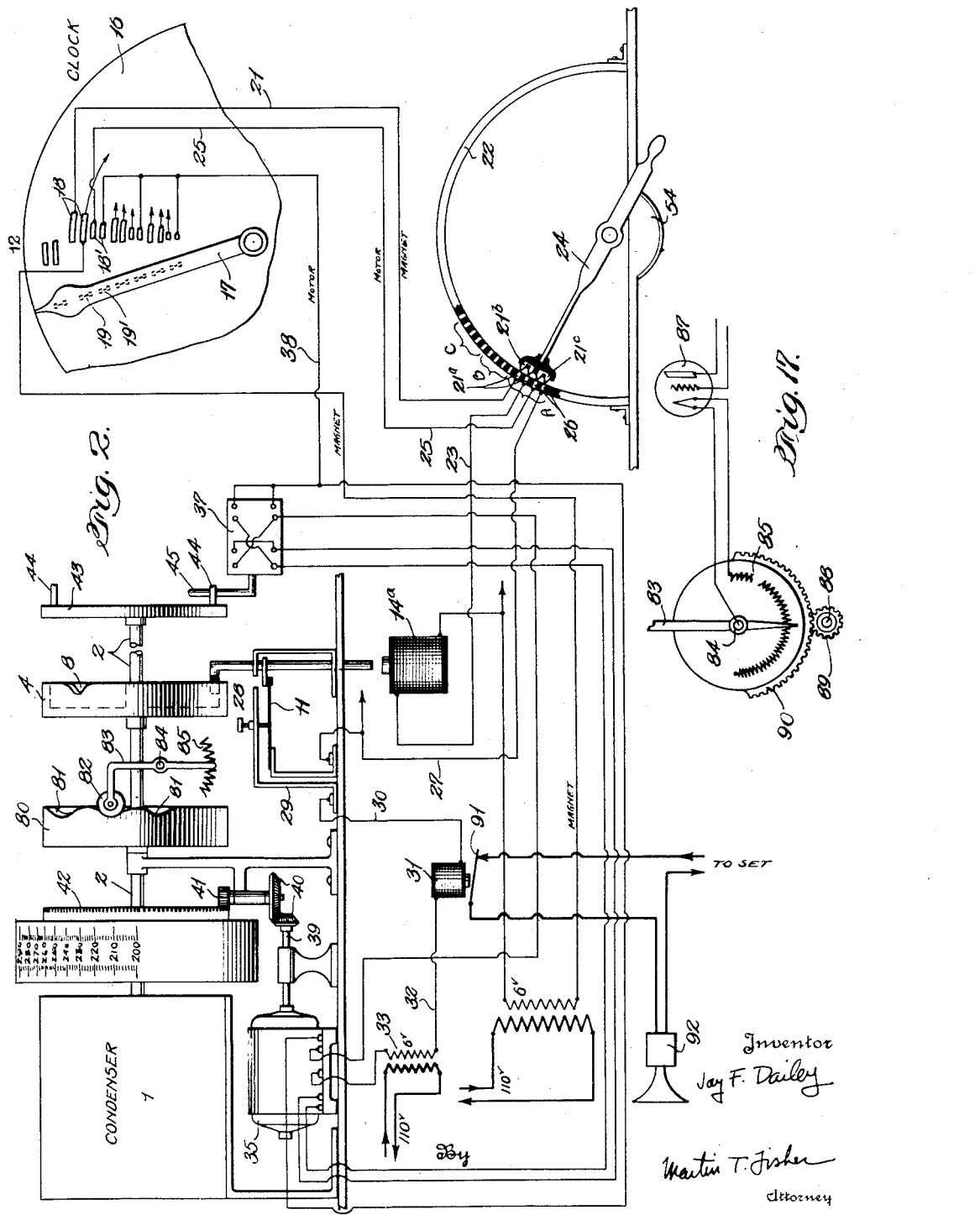
Fig. 2 is an enlarged side view of the main features of the apparatus and cooperating connections.

Referring more particularly to Fig. 2, the clock face is provided with a pair of contacts 18 which are adapted to be bridged by a metallic segment 19 on the clock hand, and thus establish a circuit from the line wire 20 through the wire 21 into contact 21ᵃ, through the U-shaped member 21ᵇ on a control lever 24, through contact 21ᶜ, in the control board segment 22 into the wire 23 and electromagnet 14A. If the control board lever 24 is set to allow such a circuit to be completed, magnet 14A will be energized and the appropriate station selector 4 latched in position by the latch 9.

The clock face is also provided with two segments 18' which are adapted to be bridged by a metallic contact member 19', a few seconds after the contacts 18 have been bridged. This establishes a circuit through the wire 25, which leads into the segment 22 of the control board and if an appropriate lever 24 is in proper position, bridges the contact points 26, the circuit continuing through the wire 27 into the standard 13, spring 11, adjusting screw 28, standard 29, wire 30, electromagnet 31, wire 32, transformer 33, wire 34, into the motor 35 and from the motor through the wire 36 to the reversing switch 37, then out wire 38 back to the other segment 18' on the clock face.

The motor circuit thus established at a time controlled by the hand 17 of the clock and by the lever 24 of the control board starts the motor, the shaft 39 of which through gears 40 drives a gear 41 which meshes with a gear 42 on the dial 3 which turn the condenser shaft 2. This turning movement of the condenser shaft continues until a notch in one of the station selectors 4, 5 or 6 is engaged by its latch 9 to hold it in a definite position, the latch that does the latching being the one whose electromagnet was energized by the bridging of the contacts 18.

When the latch 9 drops into its notch, it carries with it the spring 11, which breaks the motor circuit which has been described, because 11 disengages from the screw 28 and so the motor is stopped, and the selected station is tuned in.

Referring to Fig. 1, it will be seen that the several circuit breakers are connected in series by the wires 27', whereby operation of any latch 9 will break the motor circuit.

The condenser shaft on a radio set is usually not capable of movement through 360°, and therefore, means is provided for turning the shaft 2, not through a complete circle, but only to predetermined points in either direction. This is effected by a disk 43 on the condenser shaft 2 provided with adjustable pins 44 which are adapted to engage with the arm 45 of the reversing switch 37, the pins 44 functioning to throw the reversing switch 37 to reverse the motor in a known manner when the condenser shaft has turned far enough in either direction.

The length of the segments on the face of the clock is such that the motor will have just sufficient time to operate the condenser shaft through its cycle to right and left. Immediately thereafter, the motor and magnet currents are broken.

The contacts 18 and 18' on the clock face are arranged in groups of four, four being used for controlling one station. Referring now to Figs. 7 and 8 particularly, the second group of four contacts, just below 18', at 12 o'clock, would be for a second station, while the third or bottom group of four would be for a third station. Any desired number of such groups could, of course, be provided, according to the number of stations it is desired to have within the range of the apparatus.

The face of the clock is provided with similar groups of contacts all the way around the dial, as suggested in Fig. 7, there being provided a group of these contacts for each operating period. With the clock shown in Fig. 7, the operating periods are 15 minutes each, and so there is a group of contacts for each 15 minute period. The contact elements 19' terminate in spring pressed contact points 19'', as shown in Fig. 11, 19' being a fixed bridge serving to electrically connect points 19''.

Figure 3:
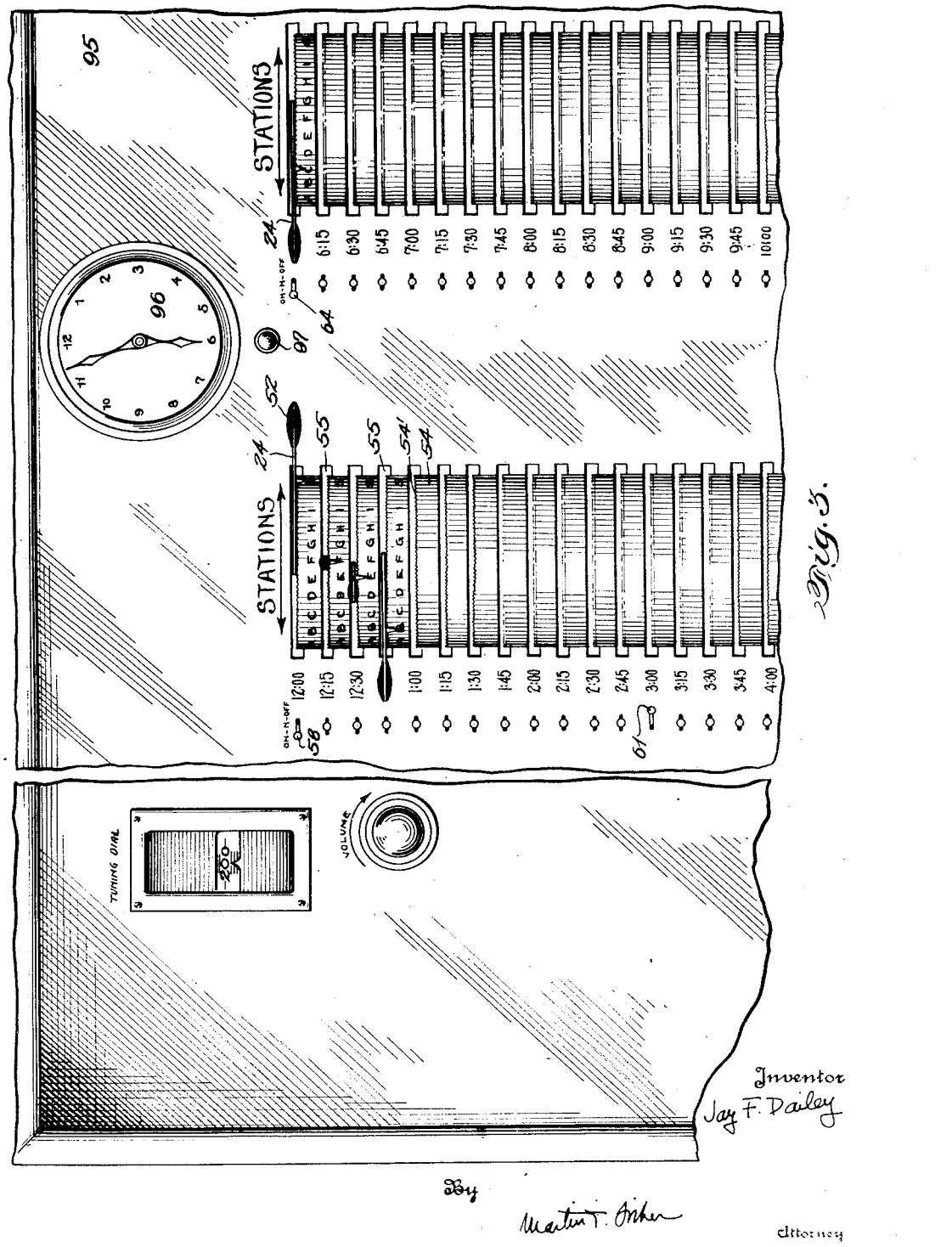
Fig. 3 is a view of the control board.

The control board will now be described. This board comprises a plurality of time levers, there being one lever for each operating period for which the set is designed. Referring to Fig. 3, where fifteen minute periods are designated, there would be four time levers for each hour and forty-eight such levers for twelve hours. These time levers are arranged in consecutive order and pivot about a common axis. A given time lever 24 is provided with pairs of bridging contact elements 50 which are in contact with a common metallic base; these are adapted to engage with a plurality of contact points, such as 26, Fig. 2, on a semi-circular segment 22, one pair of contacts controlling the magnet circuit and the other pair of contacts controlling the motor circuit, as has been described. Each station for which selector elements are provided on the condenser shaft is provided with contacts arranged in groups of four, these groups being indicated at A, B and C.

The time or control levers are arranged in a regular time sequential relationship, as shown in Fig. 3. This regular time sequence for the time or control levers facilitates their setting, and since there is only one time lever for a given time, it is impossible to close conflicting circuits with any setting of the time levers.

Figure 4:
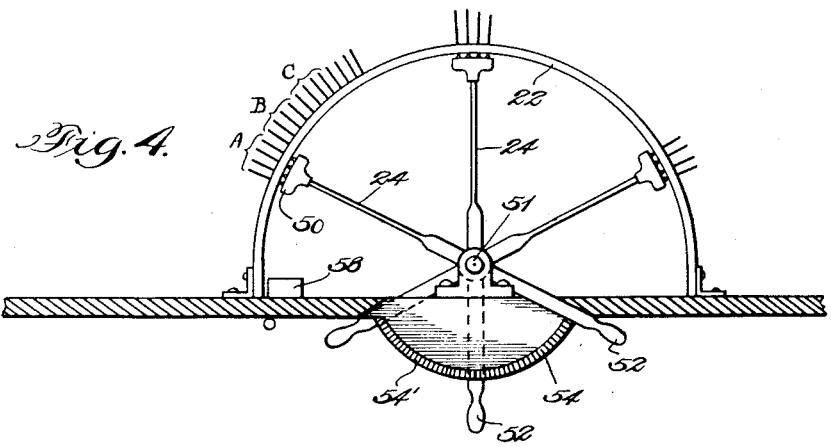
Fig. 4 is a detail of the control levers.
Figure 5:
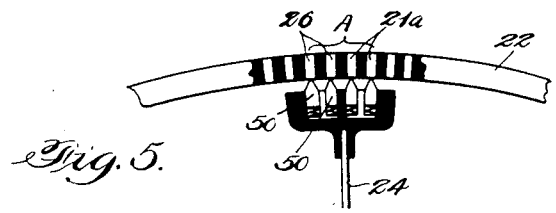
Fig. 5 is a detail of an end of the control lever and a contact segment.
Figure 6:
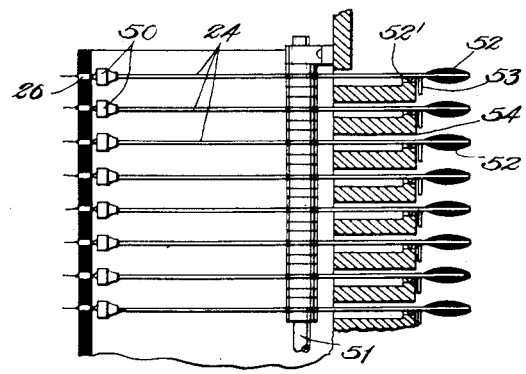
Fig. 6 is a partial section through the control board.

The portion or segment 22 is semi-cylindrical and of substantial length, extending lengthwise perpendicularly to the plane of the paper, as viewed in Figs. 4 and 5. The inner surface of 22 is covered with contact points, such as 21a or 26, arranged in groups of four, two for the magnet circuit and two for the motor circuit. As indicated on Fig. 5, there is a group of four contacts A for one station, a group of four contacts B for another station, and so on for each station. Such a row of contacts as just described is provided for each time or control lever.

The selection of a particular time lever determines the time that a station is to be tuned in. The several time handles 24, which turn on the common axis 51 are provided with manipulating ends 52 which have pointers 53 cooperating with an arcuate member 54 for indicating the particular station selected. Each handle may be provided with a tooth 52 adapted to engage with serrations 54' for frictionally holding the handle in set position.

The time handles 24 move in suitable slots 55 in the control board, the pointers 53 projecting laterally, as shown in Fig. 2, to indicate the station selected. One end of each of the slots 55 is for positioning the time levers in silent position. These spaces are designated S on Fig. 3 and as the name implies no station is selected by the time levers when they are in such positions. The set however, will continue in operation from the previous setting, even though the levers are silent, until a new setting is established or until it is turned off by the automatic control.

The mechanism for putting the set into or out of operation at predetermined times will now be described. Referring to Fig. 12, the clock face 16 is provided with contact segments 56, which are in series through the wire 57 with a reversing switch indicated generally at 58, there being one of these reversing switches and corresponding contact segments on the face of the clock for each operative period of the apparatus. As indicated in Fig. 7, such segments are provided for every fifteen minutes. In Fig. 12 the wiring diagram shows connections only at 12, 3 and 6 o'clock to the reversing switches. The current for this circuit just described is obtained through a transformer from the current which supplies the power for the electric clock and is independent of the power supplied to the radio set. Other contact segments such as 59 on the clock face are connected through the wire 60 with the reversing switch 61, while similar contact segments 62 on the face of the clock are connected through wire 63 with the reversing switch 64. These several reversing switches are connected through wires 65 to the motor 66, which is limited by any suitable means to have a limited rotation in either direction, the motor shaft being provided with a disk 67 carrying a pin 68 which actuates the arm 69 of a three-way switch 70 which is connected up in a known manner by wires 71 with a manual three-way switch 72, the latter being on the face of the set, the two described three-way switches being in the ordinary circuit which supplies current to the radio receiving set.

The several reversing switches 58, 61 and 64 are all manually settable in either of the three positions, on, neutral or off. When the switch 58 for example is on it means that the current supplied to the main set will be turned on at that time, and if at that time a station selector 11 for that hour has been placed in position for any particular station a program will be received from that station. Assume that 58 as shown on Fig. 3 is in the position as indicated "on" and the twelve o'clock lever is set at silent "S", then at that time when the clock hand 17 makes contact through segments 56 and 18 shown on Fig. 7, the circuit made through segments 56 will operate to turn on the main set supply but no station being set—no program is received.

At 12:15 o'clock the circuits created by the movement of the clock hand from segments 18 and 18' will cause the circuits operating to move the selector wheels and magnets to function, thereby tuning the set to a position wherein the condensers are placed to receive the program from station F at that time. And at that time the motor stops, and the broadcast from station F is received. As shown in Fig. 3, the next change would occur at 12:30 when station E would be tuned in and at 12:45 station B would be tuned in.

Assuming no other setting is made until three o'clock at which time the on and off reversing switch 61 shown on Fig. 3 is placed in the position as indicated, then at that time when the clock hand 17 makes its contact through segments 59, then motor 66 is placed in operation throwing switch 70, thereby turning off the main set current and terminating the broadcast reception.

As shown in Fig. 3, there may be provided on the front panel 95 of the apparatus, a clock 96 connected by a simple mechanical drive (not shown) with the electrically driven clock. A hand setting knob 97 may be provided for setting both the clocks.

The mechanism for maintaining a substantially uniform volume of sound from the loud speaker will now be described. Inasmuch as the signals from various stations at different localities vary in strength, it is necessary that this be compensated for automatically. To this end there is provided on the condenser shaft or otherwise mounted so as to move in unison with it, a cam member 80 which is provided with a cam surface or cam track 81, which is in operative engagement with a roller 82 carried on an arm 83 pivoted at 84, this arm forming or making contact with a resistor 85 which forms a part of the circuit controlling the current passing through the detector and amplifying tubes of the receiving set. As wheel 82 is, by the rotary movement of cam member 80, pushed outwardly or permitted to recede, the contact arm 86 is caused to advance or retard upon resistor 85 thereby supplying greater or lesser tube current to the tubes 87 and thus controlling the volume of sound.

A further manual control is provided to compensate for general atmospheric changes in reception. This is accomplished by the movement of a knob on a shaft passing through the front of the cabinet which shaft is shown in Fig. 17 at 88. On this shaft is attached a gear wheel 89 which meshes with teeth 90 upon the body of the rheostat 91. Thus by a slight movement in either direction of gear 89, the relative position of resistor 85 is either advanced or retarded to a position to compensate proportionately for general reception, to compensate for daily changes in receiving conditions. The cam surface or cam track 81 may be variably positionable, so that it can be set at various positions so as to control the arm 86 with respect to resistor 85 and supply the tubes with the proper amount of current in order to assure a uniform volume of sound. To this end a flexible and variably positionable cam track is provided as shown in Figs. 13 and 14. The cam track is preferably formed by a closely wound helical spring indicated at 81, the ends of which are anchored at 82 in the cam member 80. The cam track could extend for 360°, but this is usually not necessary because the usual condenser shaft has a limited arc of movement.

In order to variably position the cam track or spring 81, there is provided a plurality of units as shown in Fig. 16, each unit consisting of a saddle 83, a retaining lug 84, the saddle and lug being mounted on the threaded rod 85 carried by a block 86 which is set into the reverse side of the cam member 80 in a groove 87, the several blocks being held in place by a cover 88.

The spring 81 rests in the saddle 83 with the lug 84 engaged on the inside of the spring so as to hold the spring firmly in place in the saddle. By rotating the rod 85 with respect to the block 86, the positioning of the saddle 83 is thereby controlled which places the cam track or spring 81 at a high or low point, as may be desired. In order that the high and low points for the cam track may be positioned accurately, the blocks 86 may be placed at any desired point along the groove 81, each block having a tooth 89 which engages in serrations 90, as shown in Fig. 15. A readily adjustable cam track is thereby provided.

In order to prevent the operation of the loud speaker while the tuning shaft 2 is being turned, the electromagnet 31, which, as has been described, is in the motor circuit, moves the armature 91 which is in circuit with the current for the loud speaker 92, as shown in Figs. 1 and 2, as that the loud speaker is cut out during the tuning operation.

The operation may be briefly summarized as follows:—The operator, for example, at 5 P. M. decides he wants the program to commence at 6 P. M. and thereafter to receive the following program: At 6 o'clock, station A; at 6:30, station B; at 7:30, station E; at 8 o'clock, station D; at 8:15, off; and 8:30 station B; at 9:30, station D again; and at 10:30, off.

He would then adjust the control board as follows: He sets the 6 o'clock "on-off" switch in an "on" position and the 6 o'clock lever at station A. The 6:30 lever at station B; the 7:30 lever at station E; the 8 o'clock lever at station D; the 8:15 "on-off" switch at "off"; the 8:30 "on-off" switch at "on"; and the 8:30 time lever at B; the 9:30 lever at D and the 10:30 "on-off" switch at "off".

All other time levers remain in line with the silent position S.

These settings complete all the manual settings required for the entire program, as outlined.

At 6 o'clock, contact is made at 62, completing a circuit through switch 64 and operating motor 66 to operate switch 70 to turn on the set. A few seconds later, the magnet circuit is completed by hand 17 and the 6 o'clock time lever 24 to energize a magnet 14A. A few seconds later the motor circuit is completed by hand 17 and the same 6 o'clock time lever 24 to start the motor 35 to turn the condenser shaft until the latch 9 actuated by the energized magnet engages a notch in a station selector wheel, such as 4, and so tunes in the desired station. As the hand passes on, it breaks the magnet and motor circuits, deenergizing the just-energized magnet and the latch 9 returns to normal position.

This station continues in operation until 6:30, at which time the clock hand completes the preselected magnet and motor circuits through the 6:30 time lever 24, thus energizing an appropriate magnet, such as 14B, also starting the motor, thus tuning in station B. And so on for the other stations, the automatic operations continuing until the program is completed and the set turned off.

While the invention has been described in some detail, it should be understood that the disclosure is illustrative and not restrictive of the invention, and that it may be carried out in other ways.

I claim as my invention:

1. A mechanism for use with a radio receiving set for automatically tuning in predetermined stations at predetermined times, comprising, in combination with the usual loud speaker and vacuum tube means for actuating it, tuning mechanism, timing mechanism, means controlled by the timing mechanism, for advancing the tuning mechanism to a predetermined point at a predetermined time, a rheostat controlling the current in the filament circuit of the vacuum tube means, and means, controlled by the positioning of the tuning mechanism, for controlling said rheostat, for maintaining a substantially constant volume of sound from the loud speaker for the various stations.

2. A mechanism for use with a radio receiving set for automatically tuning in predetermined stations at predetermined times comprising in combination with the usual loud speaker and vacuum tube means for actuating it, a condenser shaft, station selector elements cooperating with the condenser shaft, timing mechanism, means, controlled by the timing mechanism, for moving the station selector elements and the condenser shaft, to predetermined points at predetermined times, a rheostat controlling the filament current of the vacuum tube means, and means, controlled by the positioning of the station selector elements, for controlling the rheostat for varying the filament current for maintaining a substantially constant volume of sound from the loud speaker for the various stations.

3. In an apparatus for automatically tuning a radio set which has the usual loud speaker and vacuum tube controlling means therefor, the combination of timing means, a control board, tuning mechanism, means controlled by the timing means and control board, for moving the tuning mechanism to a predetermined position at a predetermined time, a rheostat controlling the filament current of the vacuum tube means, and means, controlled by the positioning of the tuning mechanism, for controlling said rheostat, for controlling the filament current of the vacuum tube amplifying means, for maintaining a substantially constant volume of sound from the loud speaker for the various stations.

4. A mechanism for use with a radio receiving set for automatically tuning in predetermined stations at predetermined times, comprising in combination with the usual loud speaker and vacuum tube means for operating it, a condenser shaft, station selector elements cooperating with the condenser shaft, timing mechanism, means, controlled by the timing mechanism, for moving the station selector elements and the condenser shaft, to predetermined points at predetermined times, a rheostat controlling the filament current of the vacuum tube means, and cam means simultaneously movable with the condenser shaft, for controlling said rheostat, for rendering the volume of sound from the loud speaker substantially constant.

5. A mechanism for use with a radio receiving set for automatically tuning in a predetermined station at a predetermined time, comprising in combination with the usual loud speaker and vacuum tube means for actuating it, a plurality of station selecting elements, each adapted to select a particular station, time-controlled means for moving the station selecting elements in unison at a predetermined time, means for stopping the movement of the station selecting elements when the desired station selecting element is in proper position, a rheostat controlling the filament current of the vacuum tube means, and cam means simultaneously movable with the station selecting elements, for controlling said rheostat.

6. An apparatus for automatically tuning a radio set, having the usual loud speaker and vacuum tube means for actuating it, comprising in combination timing mechanism, a manually settable control board on which is set the station desired and the time that station is desired, tuning mechanism, means, controlled by the timing mechanism and the control board, for moving the tuning mechanism to tune in a predetermined station at a predetermined time, a rheostat controlling the filament current of the vacuum tube means, and cam means simultaneously movable with the tuning mechanism, for controlling the rheostat.

7. A mechanism for use with a radio receiving set having the usual loud speaker and vacuum tube means for actuating it, for automatically tuning in a predetermined station at a predetermined time, comprising tuning mechanism, timing mechanism, means controlled by the timing mechanism, for advancing the tuning mechanism to a predetermined point at a predetermined time, a rheostat controlling the filament current of the vacuum tube means, means controlled by the positioning of the tuning mechanism for controlling the rheostat, and means for bodily moving the rheostat for changing its effect.

8. A mechanism for use with a radio receiving set, having the usual loud speaker and vacuum tube means for actuating it, for automatically tuning in a predetermined station at a predetermined time, comprising in combination a plurality of station selecting elements, each adapted to select a particular station, time-controlled means for moving the station selecting elements in unison at a predetermined time, means for stopping the movement of the station selecting elements when the desired station selecting element is in proper position, a rheostat controlling the filament current of the vacuum tube means, the positioning of the tuning means controlled by the positioning of the tuning mechanism for controlling the rheostat, and means for bodily moving the rheostat for changing its effect.

9. A mechanism for use with a radio receiving set having the usual loud speaker and vacuum tube actuating means therefor, for automatically tuning in a predetermined station at a predetermined time, comprising in combination a plurality of station selecting elements, each adapted to select a particular station, time-controlled means for moving the station selecting elements in unison at a predetermined time, means for stopping the movement of the station selecting elements when the desired station selecting element is in proper position, a rheostat controlling the filament current of the vacuum tube means for thereby controlling the volume of sound from the loud speaker, cam means simultaneously movable with the station selector elements for controlling the rheostat, and means for bodily moving the rheostat for changing its effect.

10. A device for controlling the volume of sound from a radio receiving set which is adapted to receive signals of varying strength, comprising tuning means, a rheostat, for controlling the filament current of a vacuum tube, and cam means simultaneously movable with the tuning means, for controlling the rheostat, the curvatures of the cam being shaped to control the volume of sound received from particular broadcasting stations.

11. A device for controlling the volume of sound from a radio receiving set which is adapted to receive signals of varying strength, comprising tuning means, a rheostat, for controlling the filament current of a vacuum tube, and cam means simultaneously movable with the tuning means, for controlling the rheostat, the curvatures of the cam being shaped to control the volume of sound received from particular broadcasting stations, said curvatures of the cam being also manually adjustable.

12. A device for controlling the volume of sound from a radio receiving set which is adapted to receive signals of varying strength, comprising tuning means, a rheostat, for controlling the filament current of a vacuum tube, and cam means mounted on the condenser shaft, for controlling the rheostat, the curvatures of the cam being shaped to control the volume of sound received from particular broadcasting stations.

13. A device for controlling the volume of sound from a radio receiving set which is adapted to receive signals of varying strength, comprising tuning means, a rheostat, for controlling the rheostat filament current of a vacuum tube, the rheostat being bodily movable with respect to the movable arm thereof, and cam means simultaneously movable with the tuning means, for controlling the rheostat, the curvatures of the cam being shaped to control the volume of sound received from particular broadcasting stations.

14. A device for controlling the volume of sound from a radio receiving set which is adapted to receive signals of varying strength, comprising tuning means, a rheostat, for controlling the filament current of a vacuum tube, the rheostat being bodily movable with respect to the movable arm thereof, means for moving and setting the rheostat in adjusted positions, and cam means simultaneously movable with the tuning means, for controlling the rheostat, the curvatures of the cam being shaped to control the volume of sound received from particular broadcasting stations.

15. A device for controlling the volume of sound from a radio receiving set which is adapted to receive signals of varying strength, comprising tuning means, a rheostat, for controlling the filament current of a vacuum tube, and cam means having a flexible guide track, the cam means being simultaneously movable with the tuning means, for controlling the rheostat, the curvatures of the cam being shaped to control the volume of sound received from particular broadcasting stations.

16. A device for controlling the volume of sound from a radio receiving set which is adapted to receive signals of varying strength, comprising tuning means, a rheostat, for controlling the filament current of a vacuum tube, and cam means having a flexible guide track, means for manually setting the flexible guide track, the cam means being simultaneously movable with the tuning means, for controlling the rheostat, the curvatures of the cam being shaped to control the volume of sound received from particular broadcasting stations.

17. A device for controlling the volume of sound from a radio receiving set which is adapted to receive signals of varying strength, comprising tuning means, a rheostat, for controlling the filament current of a vacuum tube, and cam means having a flexible guide track, means for adjusting the flexible guide track circumferentially, and also in a direction parallel with the axis of the cam means, for controlling the rheostat, the curvatures of the cam being shaped to control the volume of sound received from particular broadcasting stations.

JAY F. DAILEY.